United States Patent
Subramanian et al.

(10) Patent No.: US 11,269,115 B2
(45) Date of Patent: Mar. 8, 2022

(54) SPECKLED CALIBRATION ARTIFACT TO CALIBRATE METROLOGY EQUIPMENT

(71) Applicant: Photogauge, Inc., Alamo, CA (US)

(72) Inventors: Sankara J. Subramanian, Alamo, CA (US); Sameer Sharma, Alamo, CA (US); Iniyan Thiruselvam, Alamo, CA (US); Arunnelson Xavier, Alamo, CA (US)

(73) Assignee: PHOTOGAUGE, INC., Belmont, CA (US)

( * ) Notice: Subject to any disclaimer, the term of this patent is extended or adjusted under 35 U.S.C. 154(b) by 120 days.

(21) Appl. No.: 16/560,823

(22) Filed: Sep. 4, 2019

(65) Prior Publication Data
US 2021/0063604 A1 Mar. 4, 2021

(51) Int. Cl.
*G01W 1/18* (2006.01)
*G01B 21/04* (2006.01)
*G01J 3/46* (2006.01)
*G01B 11/02* (2006.01)

(52) U.S. Cl.
CPC ............ *G01W 1/18* (2013.01); *G01B 21/042* (2013.01); *G01B 11/02* (2013.01); *G01J 3/46* (2013.01)

(58) Field of Classification Search
CPC ....... G01W 1/18; G01B 21/042; G01B 11/02; G01J 3/46; G01C 11/00
See application file for complete search history.

(56) References Cited

U.S. PATENT DOCUMENTS

| | | |
|---|---|---|
| 3,110,987 A | 11/1963 | Ameson |
| 6,850,858 B1 | 2/2005 | West |
| 7,361,941 B1 | 4/2008 | Lorusso |
| 7,473,502 B1 | 1/2009 | Ausschnitt |
| 7,788,818 B1 | 9/2010 | Tran |
| 8,294,958 B2 * | 10/2012 | Paterson ............ G01B 11/2518 358/474 |
| 8,345,243 B2 | 1/2013 | Ghinovker |
| 8,826,719 B2 | 9/2014 | Weekers |
| 2002/0185053 A1 | 12/2002 | Fei |
| 2009/0190831 A1 * | 7/2009 | Van Der Putten ... G06K 9/3216 382/165 |
| 2011/0206258 A1 * | 8/2011 | Chen .................... A61B 6/5258 382/131 |
| 2014/0180620 A1 | 6/2014 | Hicks |
| 2018/0058840 A1 | 3/2018 | Lamendola |
| 2018/0101937 A1 * | 4/2018 | Borsholm ............... G06T 5/005 |

OTHER PUBLICATIONS

Webpages from https://trapet.de/ dated Aug. 13, 2019.

* cited by examiner

*Primary Examiner* — Mohammad K Islam
(74) *Attorney, Agent, or Firm* — Inventive Law Inc.; Jim H. Salter

(57) ABSTRACT

A speckled calibration artifact to calibrate metrology equipment is disclosed. A particular embodiment includes a geometric solid having a smooth outer surface of a solid base color; and a speckled contrasting color applied on the outer surface of the geometric solid in a randomly speckled pattern enabling portions of the solid base color and portions of the contrasting color to be visible on the smooth outer surface of the geometric solid.

15 Claims, 4 Drawing Sheets

```
                    ┌─────────────────────────────────────────────┐
                    │  Method For Using A Speckled Calibration     │
                    │  Artifact For Calibrating Metrology Equipment│
                    └─────────────────────────────────────────────┘
                                         │
                                         ▼
            ┌───────────────────────────────────────────────────────┐
            │ Provide a geometric solid having a smooth outer       │
            │ surface of a solid base color.                         │
            └───────────────────────────────────────────────────────┘
                                         │
                                         ▼
            ┌───────────────────────────────────────────────────────┐
            │ Apply a speckled contrasting color on the outer surface│
            │ of the geometric solid in a randomly speckled pattern  │
            │ enabling portions of the solid base color and portions │
            │ of the contrasting color to be visible on the smooth   │
            │ outer surface of the geometric solid, the geometric    │
            │ solid with the applied speckled contrasting color being│
            │ a speckled calibration artifact.                       │
            └───────────────────────────────────────────────────────┘
                                         │
                                         ▼
            ┌───────────────────────────────────────────────────────┐
            │ Use the speckled calibration artifact for calibrating  │
            │ metrology equipment.                                   │
            └───────────────────────────────────────────────────────┘
                                         │
                                         ▼
                                     ( End )
```

Fig. 4

SPECKLED CALIBRATION ARTIFACT TO CALIBRATE METROLOGY EQUIPMENT

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2018-2019 PhotoGAUGE, Inc., All Rights Reserved.

TECHNICAL FIELD

This patent application relates to computer-implemented software systems, metrology systems, photogrammetry-based systems, and automatic visual measurement or inspection systems, according to one embodiment, and more specifically to a speckled calibration artifact to calibrate metrology equipment.

BACKGROUND

Calibration artifacts are used to calibrate and/or certify metrology equipment such as Coordinate Measurement Machines (CMM) and optical scanners. These calibration artifacts are precisely manufactured and measured in an accredited laboratory before being sent out for use. Typical calibration artifact geometries include arrays of spheres laid out in geometric patterns, such as a line or a tetrahedron. The material used to manufacture the calibration artifact geometries depends on the metrology equipment being calibrated. For CMMs and other equipment that use touch probing, a polished steel calibration artifact is commonly used; whereas, for optical metrology, such as laser scanning or blue-light scanning, the calibration artifacts are typically made of an opaque, hard, white ceramic material.

For photogrammetry-based scanners, it is important for the scanned object to have visual texture. However, neither the standard metallic nor the white ceramic calibration artifacts have such texture; therefore, these conventional calibration artifacts cannot be used to calibrate or certify photogrammetry-based scanners.

SUMMARY

In various example embodiments described herein, a speckled calibration artifact to calibrate metrology equipment is disclosed. In the various example embodiments described herein, a speckled artifact provides excellent visual or optical texture enabling the calibration and certification of metrology equipment, including photogrammetry-based scanners.

In one example embodiment of the disclosed speckled calibration artifact, the outer surface of a geometric solid is covered with a speckle pattern to present a visual texture on the surface of the solid. In a particular embodiment, the geometric solid is a sphere. The sphere can be made of a hard white ceramic material on which a black paint or other material is sprayed in a randomly speckled pattern. The geometric solid with the applied speckled pattern can be finished by polishing and lapping to produce a smooth speckled surface. The resulting speckled calibration artifact can be used to calibrate and certify metrology equipment, including photogrammetry-based scanners. The various example embodiments are described in more detail below.

BRIEF DESCRIPTION OF THE DRAWINGS

The various embodiments are illustrated by way of example, and not by way of limitation, in the figures of the accompanying drawings in which:

FIG. 4 illustrates a process flow diagram of a method of an example embodiment as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a speckled calibration artifact to calibrate metrology equipment is disclosed. In the various example embodiments described herein, a speckled artifact provides excellent visual texture enabling the calibration and certification of metrology equipment, including photogrammetry-based scanners.

In one example embodiment of the disclosed speckled calibration artifact, the outer surface of a geometric solid is covered with a speckled surface to present a visual or optical texture on the surface of the solid. In a particular embodiment, the geometric solid is a sphere; however, the techniques described herein can be used with other geometric solid shapes as well. The sphere can be made of a hard white ceramic material on which a black paint or other material is sprayed in a randomly speckled pattern. The geometric solid with the applied speckled pattern can be finished by polishing and lapping to produce a smooth speckled surface. The resulting speckled calibration artifact can be used to calibrate and certify metrology equipment, including photogrammetry-based scanners. The random speckle pattern on the surface of the speckled calibration artifact enables a photogrammetry-based scanner to be calibrated and certified with a high degree of precision, which is not possible using conventional calibration objects.

Figure 1:
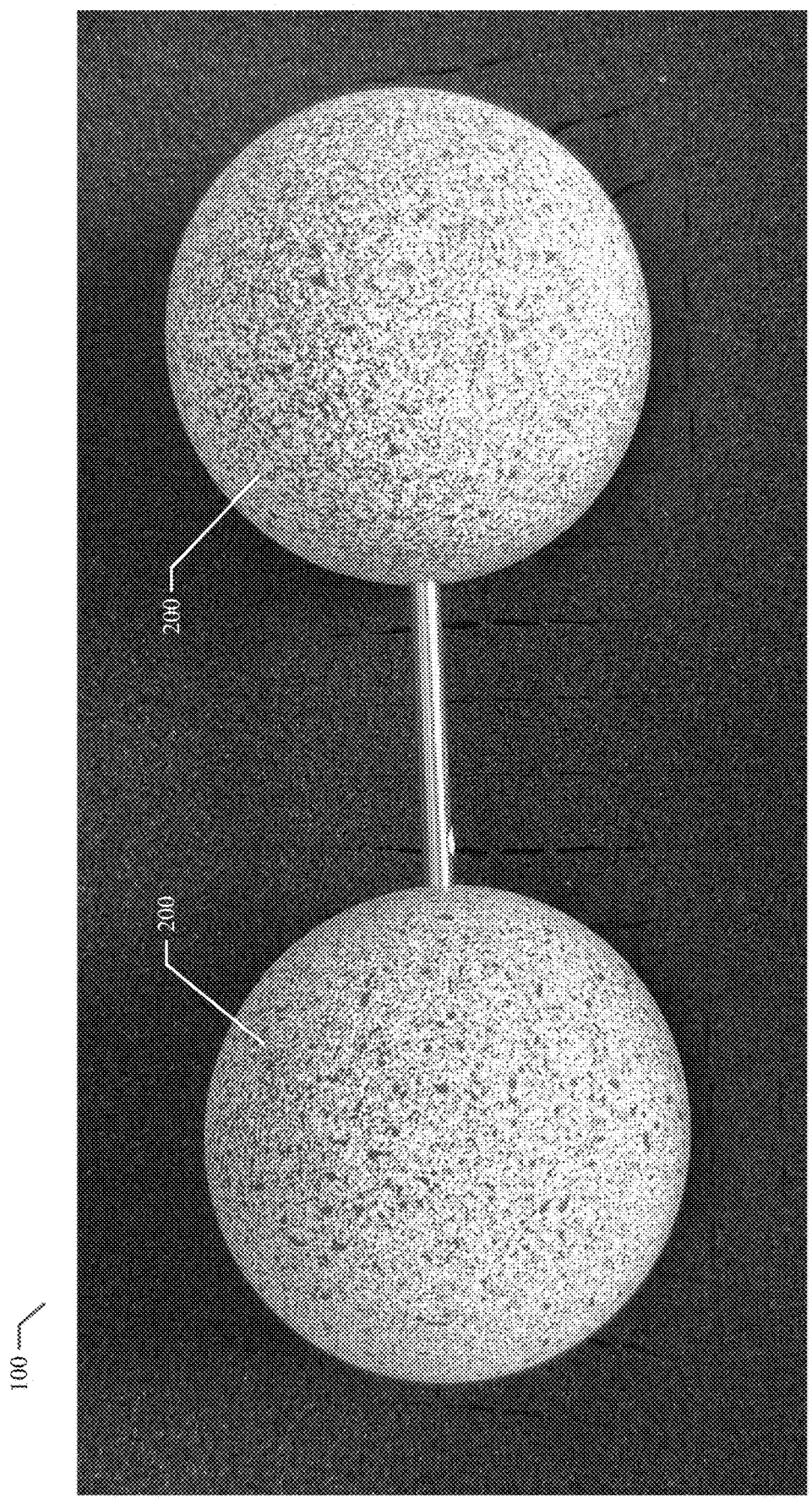
FIG. 1 illustrates an example embodiment of a speckled calibration artifact comprising a speckled dumbbell having two spheres coupled with a rod between the spheres, wherein each sphere is made of white ceramic, sprayed with a black paint, and polished/lapped to the desired sphericity.

FIG. 1 illustrates an example embodiment of a speckled calibration artifact 100 comprising a speckled dumbbell having two spheres 200 coupled with a rod between the spheres 200, wherein each sphere 200 is made of white ceramic, sprayed with a black paint, and polished/lapped to the desired sphericity. In the example embodiment shown in FIG. 1, the geometric solid of the speckled calibration artifact 100 comprises two interconnected spheres 200 of approximately equal diameters. It will be apparent to those of ordinary skill in the art in view of the disclosure herein that the techniques described herein can be used with other geometric solid shapes or other three-dimensional (3D)

shapes as well. In the example embodiment shown in FIG. 1, each sphere 200 can be fabricated from a hard white ceramic material so that the outer surfaces of the spheres 200 are a solid white color, or a desired solid base color. In other embodiments, the spheres 200 can be fabricated from other types of materials, such as plastics, metals, composite materials, or the like. These materials can be fabricated of a desired base color (e.g., white) or the desired base color can be applied to the surface of the solid after fabrication. As described above, the outer surfaces of the spheres 200 can also be a solid base color other than white. Each sphere 200 can be machined with a high degree of precision using standard techniques to produce spheres with uniform radii within pre-defined tolerances at any angle from center.

Once the spheres 200 are produced as described above, a randomly speckled pattern can be applied to the outer surface of each sphere 200 over the base color using a contrasting color (e.g., black). In a particular example embodiment, the random speckle pattern can be applied by spraying a speckled layer of paint onto the outer surface of each sphere 200 over the base color. As a result, the contrasting color is applied in a random speckle pattern to the outer surface of each sphere 200 thereby allowing portions of the solid base color of the sphere underneath to show through in a random pattern. Thus, the outer surface of each sphere 200 appears speckled in a random pattern with portions of the solid base color of the sphere showing in some areas and the contrasting color showing in other areas on the surface of each sphere 200. The two spheres 200 of the speckled calibration artifact 100 fabricated with the random speckle pattern can be finished by polishing and lapping to produce a smooth speckled surface with a visual texture on each sphere 200 of the speckled calibration artifact 100.

Figure 2:
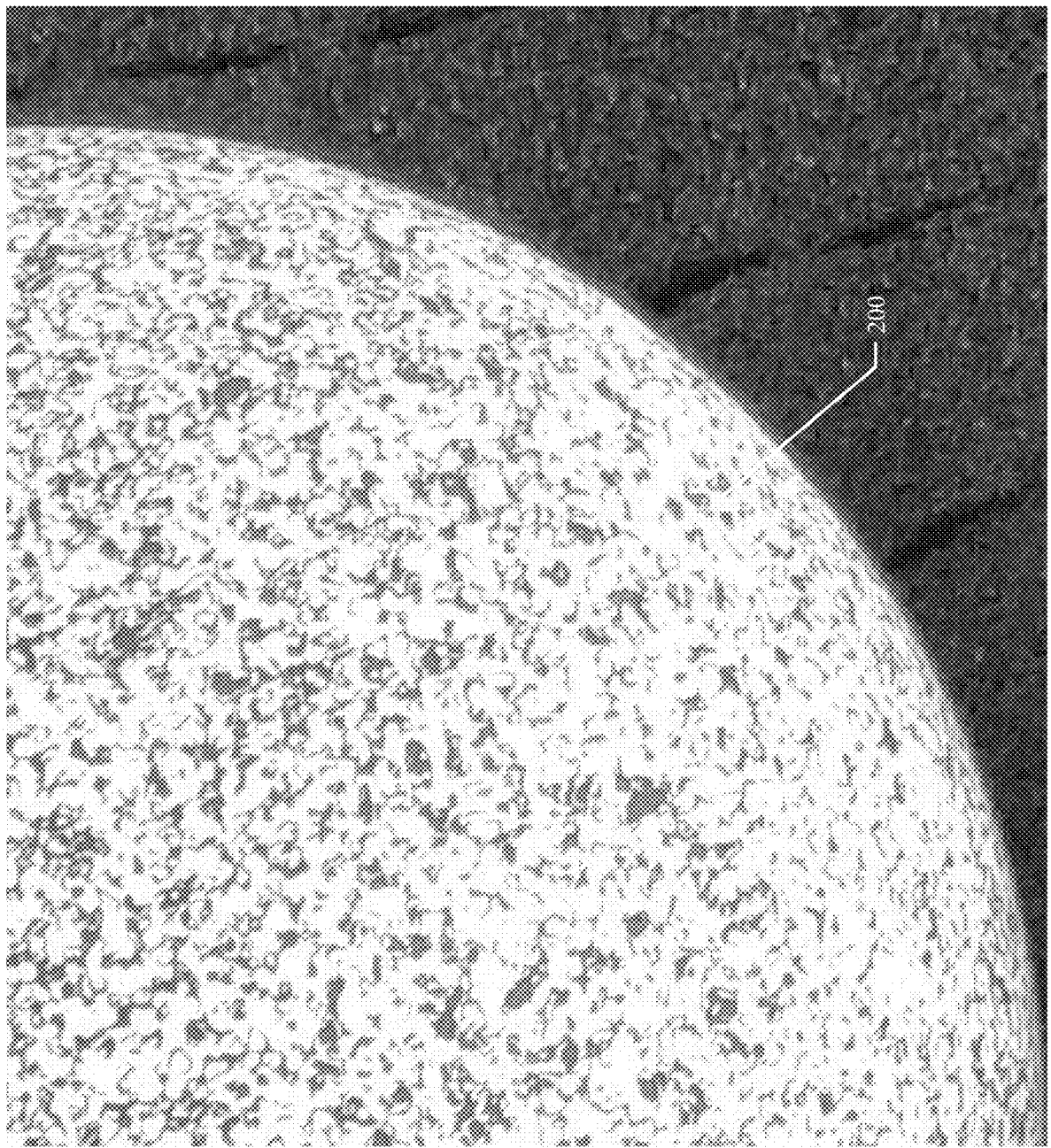
FIG. 2 illustrates a portion of a sphere of a speckled calibration artifact of an example embodiment.
Figure 3:
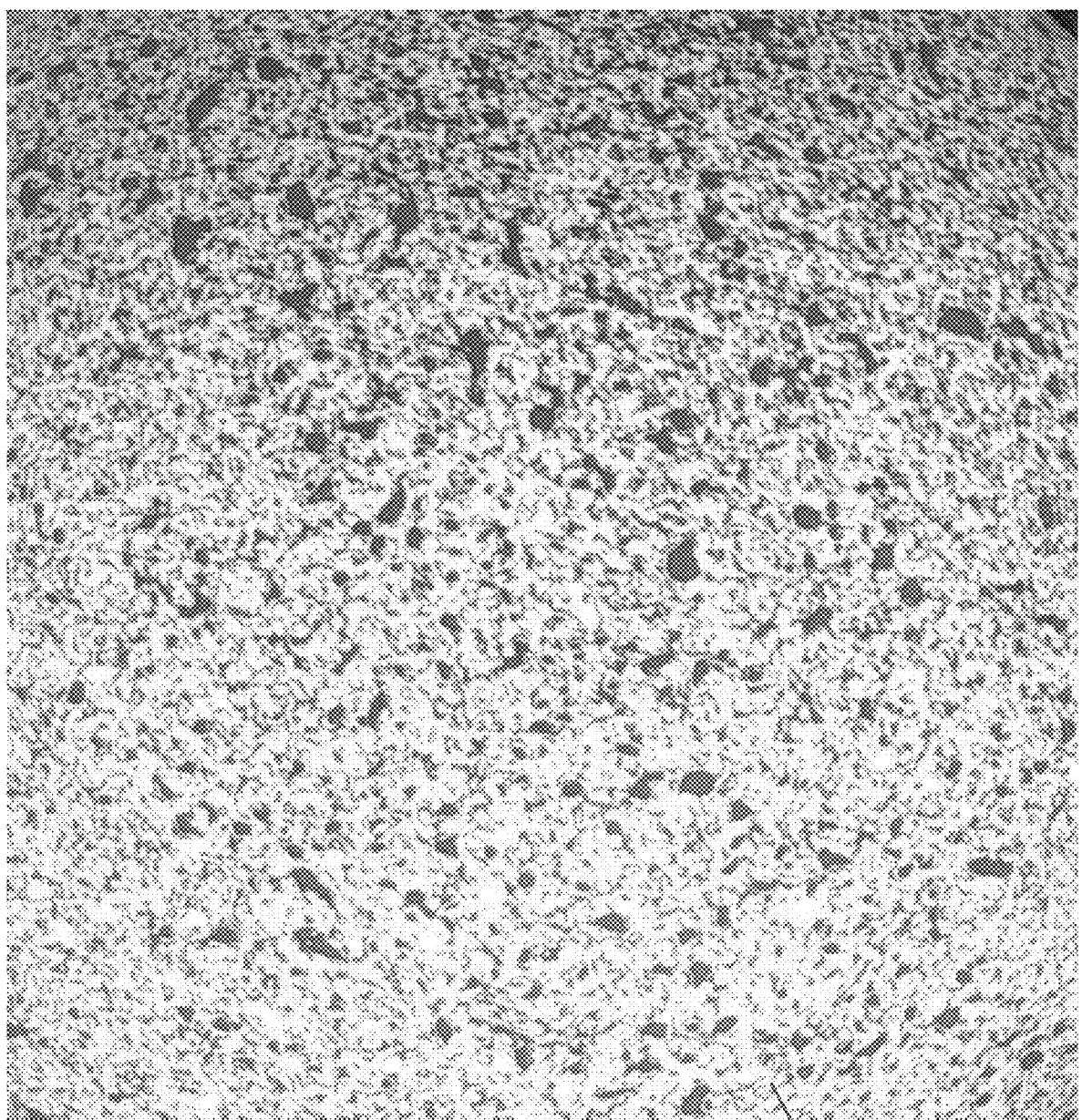
FIG. 3 illustrates a close-up view of a portion of a sphere of a speckled calibration artifact of an example embodiment.

FIG. 2 illustrates a portion of a sphere 200 of a speckled calibration artifact 100 of an example embodiment. FIG. 3 illustrates a close-up view of a portion of a sphere 200 of a speckled calibration artifact 100 of an example embodiment. As shown, the random speckle pattern applied to the outer surface of each sphere 200 allows portions of the solid base color of the sphere underneath to show through in a random pattern. Thus, the outer surface of each sphere 200 appears speckled in a random pattern with portions of the solid base color of the sphere showing in some areas and the contrasting color showing in other areas on the surface of each sphere 200.

Referring again to the example embodiment shown in FIG. 1, the two spheres 200 of the speckled calibration artifact 100 fabricated with the random speckle pattern and finished to a smooth surface can be joined together with a rod therebetween to produce the dumbbell geometric solid with the applied speckled pattern, thereby producing the speckled calibration artifact 100. The resulting speckled calibration artifact 100 can be used to calibrate and certify metrology equipment, including photogrammetry-based scanners. The random speckle pattern on the surface of the speckled calibration artifact 100 enables a photogrammetry-based scanner to be calibrated and certified with a high degree of precision, which is not possible using conventional calibration objects.

In the various example embodiments disclosed herein, there are no size or shape limitations on the disclosed speckled calibration artifact. The disclosed speckled calibration artifact covers al calibration artifacts irrespective of geometry, size, or material. Additionally, there are no specific choices of material or processes that need to be practiced, other than the materials and processes described herein. As disclosed herein, the speckled calibration artifact provides a random speckle pattern to the artifact surface so that texture-based photogrammetry equipment can be successfully used to obtain a high-precision scan of the artifact. Once the speckled calibration artifact with the random speckle pattern is scanned, the texture-based photogrammetry equipment can be calibrated and/or certified with a high degree of precision. Additionally, the various example embodiments disclosed herein can be used to calibrate or certify other types of photogrammetric equipment and other optical systems that require optical texture for accurate calibration.

In the various example embodiments disclosed herein, there is no particular geometry needed for the speckling. In the example embodiments, the speckling can be a random pattern, typically achieved by spraying a contrasting color in a speckled pattern over a solid base color. The calibration does not depend on the particular speckle pattern used on the surface of the speckled calibration artifact. In alternative embodiments, different contrasting colors can be used to achieve variations in the contrast between colors. For example, the random speckle pattern can be achieved by spraying the geometric solid with white paint on a black outer base surface of the solid. This type of inverse pattern can be used for calibration. This technique can be further extended by using colors or paints that may only provide contrast under different conditions or when imaged using different cameras. For example, if a blue filter is used on a regular optical camera, a red color will appear very dark, so a red spray paint on a blue outer base surface of the solid will also provide adequate contrast under this condition. In other embodiments, the required contrast between the speckle pattern colors can be achieved with an infra-red camera. Various mechanisms and methodologies exist to generate the requisite contrast between the speckle pattern colors for different applications. Nevertheless, the disclosed speckled calibration artifact can be effectively used for calibration and certification in most all applications.

Although an example embodiment shown in FIG. 1 is a dumbbell shape, the particular shape of the calibration artifact is not significant. The main important feature is to fabricate a calibration artifact with a geometry that can be precisely manufactured and measured. In the particular example embodiment disclosed herein, we can measure the shape (sphericity) and radius of each sphere and the overall length of the artifact to a high level of precision using conventional methods. These measurements become the values that are used to benchmark with photogrammetry. Although spheres are relatively easy to finish to a high level of precision, other shapes of the calibration artifact can also be used, such as a cylindrical object, a rectangular block, or any more complicated geometries that can also be finished to a high level of precision and measurement.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A speckled calibration artifact for calibrating metrology equipment, the speckled calibration artifact comprising:
   a plurality of geometric solids connected by a rod to form a dumbbell shape, each of the plurality of geometric solids having a smooth outer surface of a solid base color; and
   each of the plurality of geometric solids having a speckled contrasting color on the outer surface in a randomly speckled pattern enabling portions of the solid base color and portions of the contrasting color to be visible on the smooth outer surface of the plurality of geometric solids.

2. The speckled calibration artifact of claim 1 wherein the solid base color is from the group consisting of: white, black, blue, and red.

3. The speckled calibration artifact of claim 1 wherein the contrasting color is from the group consisting of: white, black, blue, and red.

4. The speckled calibration artifact of claim 1 wherein the plurality of geometric solids are spheres.

5. The speckled calibration artifact of claim 1 wherein the speckled contrasting color is applied on the outer surface of each of the plurality of geometric solids by spray painting.

6. A method for using a speckled calibration artifact for calibrating metrology equipment, the method comprising:
   providing a geometric solid having a smooth outer surface of a solid base color;
   applying a speckled contrasting color on the outer surface of the geometric solid by spraying paint in a randomly speckled pattern enabling portions of the solid base color and portions of the contrasting color to be visible on the smooth outer surface of the geometric solid, the geometric solid with the applied speckled contrasting color being a speckled calibration artifact; and
   using the speckled calibration artifact for calibrating metrology equipment, the calibrating including scanning the speckled calibration artifact to obtain a high-precision scan of the speckled calibration artifact and using the scan to calibrate the metrology equipment.

7. The method of claim 6 including:
   providing two spherical geometric solids, each of the two spherical geometric solids having a smooth outer surface of a solid base color, and a speckled contrasting color applied on the outer surface of each of the two spherical geometric solids in a randomly speckled pattern enabling portions of the solid base color and portions of the contrasting color to be visible on the smooth outer surface of each of the two spherical geometric solids; and
   connecting each of the two spherical geometric solids with a rod to form a dumbbell shape.

8. The method of claim 6 wherein the solid base color is from the group consisting of:
   white, black, blue, and red.

9. The method of claim 6 wherein the contrasting color is from the group consisting of: white, black, blue, and red.

10. The method of claim 6 wherein the geometric solid is a sphere.

11. A method for using a speckled calibration artifact for calibrating metrology equipment, the method comprising:
    obtaining a geometric solid having a smooth outer surface of a solid base color, the geometric solid having a speckled contrasting color on the outer surface in a randomly speckled pattern enabling portions of the solid base color and portions of the contrasting color to be visible on the smooth outer surface of the geometric solid, the geometric solid with the speckled contrasting color being a speckled calibration artifact; and
    using the speckled calibration artifact for calibrating metrology equipment, the calibrating including scanning the speckled calibration artifact to obtain a high-precision scan of the speckled calibration artifact and using the scan to calibrate the metrology equipment.

12. The method of claim 11 including:
    obtaining two spherical geometric solids, each of the two spherical geometric solids having a smooth outer surface of a solid base color, and a speckled contrasting color applied on the outer surface of each of the two spherical geometric solids in a randomly speckled pattern enabling portions of the solid base color and portions of the contrasting color to be visible on the smooth outer surface of each of the two spherical geometric solids; and
    connecting each of the two spherical geometric solids with a rod to form a dumbbell shape, the two spherical geometric solids with the speckled contrasting color connected with the rod being the speckled calibration artifact.

13. The method of claim 11 wherein the solid base color is from the group consisting of:
    white, black, blue, and red.

14. The method of claim 11 wherein the contrasting color is from the group consisting of:
    white, black, blue, and red.

15. The method of claim 11 wherein the geometric solid is a sphere.

* * * * *